June 20, 1967  H. H. BLISS ETAL  3,325,914
DEVICE FOR VISUALLY PORTRAYING CONCEPTS OF ORGANIC CHEMISTRY
Filed June 1, 1965  6 Sheets-Sheet 1

FIG-1

○ = CARBON
oo = ELECTRONS
o = HYDROGEN
⊗ = HALOGEN
◉ = NITROGEN
⊙ = OXYGEN

INVENTORS
HORACE H. BLISS,
MICHEL A. LYNCH &
JOHN L. BARRETT
BY Dunlap & Laney
ATTORNEYS

June 20, 1967 H. H. BLISS ETAL 3,325,914
DEVICE FOR VISUALLY PORTRAYING CONCEPTS OF ORGANIC CHEMISTRY
Filed June 1, 1965 6 Sheets-Sheet 5

FIG. 7

INVENTORS
HORACE H. BLISS,
MICHEL A. LYNCH &
JOHN L. BARRETT
BY
Dunlap & Laney
ATTORNEYS June 20, 1967 H. H. BLISS ETAL 3,325,914
DEVICE FOR VISUALLY PORTRAYING CONCEPTS OF ORGANIC CHEMISTRY
Filed June 1, 1965 6 Sheets-Sheet 6

INVENTORS
HORACE H. BLISS,
MICHEL A. LYNCH &
JOHN L. BARRETT
BY Dunlap & Laney
ATTORNEYS

United States Patent Office 3,325,914
Patented June 20, 1967

3,325,914
DEVICE FOR VISUALLY PORTRAYING CONCEPTS OF ORGANIC CHEMISTRY
Horace H. Bliss, 1320 Huntington Way, Norman, Okla. 73069; Michel A. Lynch, 161 Lake Aluma Drive, Oklahoma City, Okla. 73121, and John L. Barrett, 2821 Oklahoma St., Muskogee, Okla. 74401
Filed June 1, 1965, Ser. No. 460,261
16 Claims. (Cl. 35—18)

This invention relates to devices for visually imparting knowledge, and more particularly, to a device for visually portraying, in easily understood form, certain concepts and principles of organic chemistry.

The instructional value of devices of the type which facilitate the rapid and easily understood visual display of knowledge is now well recognized as evidenced by the widespread use of such devices in the instruction of various disciplines, and in the study of various fields. Charts, graphs and still pictures or photographs constitute, of course, examples of the oldest and simplest forms of visually portraying information. More recently, motion pictures and other animated or sequentially appearing types of information portrayal have been developed and possess the advantage of requiring less effort by instructors or other operating personnel to present more information, and in most instances, of allowing the observer of such information to obtain a better grasp of the relationships existing between the various concepts or principles represented by the sequentially portrayed information.

In many of the more recent types of devices which have been developed for displaying for visual observation a series or group of related concepts or items of knowledge, the consecutive or sequential display of the concepts is accomplished by successive illumination of indicia or symbols in a manner calculated to permit an observer to best understand the total body of knowledge under study, and yet to fully appreciate the relationships which exist between the several concepts within such body by virtue of the sequential presentation. Although devices employing such sequential illumination of indicia have proven very effective in the presentation of many types of subject matter for student observation, in some fields, the complexity and sheer quantity of indicia or symbols which must be lighted in intricate or difficult sequences and patterns has prevented the extension of this instructional technique to such areas.

An example of a field of knowledge which has not yet been presented by this method of instruction is that of organic chemistry. The lack of development of instructional devices of the described type in this field has been primarily due to the difficulty of arranging a reasonable number of illuminable indicia in a small space so as to permit the portrayal of a sufficient number of the basic concepts of organic chemistry to make the use of the device for instruction feasible and competitive with such older and time-tried methods as three-dimensional sphere and stick models. Those skilled in organic chemistry, and particularly, instructors of this subject, will appreciate the great variety of carbon containing compounds and electrons sharing arrangements which should be demonstrable by such a device in order to make its use desirable.

A second problem which hampers the construction of a useful, illuminated indicia instructional device for use in the instruction of organic chemistry is the provision of simple, easily operated, yet relatively inexpensive electrical circuitry or other suitable means for sequentially illuminating the great variety of indicia in the various combinations and patterns thereof which must be lighted. Although devices for teaching inorganic chemistry have previously been proposed and employ relatively simple electrical circuitry, including a minimum number of easily manipulated switches, these devices, such as that shown in H. S. van Doren U.S. Patent 2,085,881, generally provide only for the illumination of a few individual indicia at a single time and in only a few sequences. No problem is presented of arranging great numbers of small incandescent bulbs or other illuminable members in a reasonably small area and in a manner which permits the simplicity of the electrical circuitry to be retained.

The present invention provides a novel device which may be effectively used conjunctively with oral instruction for visually demonstrating the role of the carbon atom in the formation and constitution of organic compounds, the covalent bonds existing in organic compounds, the growth and extension of hydrocarbon chains, the nature of unsaturated bonds in organic compounds, the various types of hydrocarbon compounds, both substituted and unsubstituted, the relationship between members of a homologous series of organic compounds, the relationship of isomeric organic compounds, the nature of oxygen, nitrogen and halogen containing functional groups in organic compounds, and the present theories regarding the position and relationship of electrons in aromatic hydrocarbon compounds. These concepts may be visually presented by the device with a minimum of physical manipulative effort on the part of the instructor, and the arrangement of illuminated indicia and its sequence of presentation are ingeniously calculated to permit an observing student to rapidly and easily correlate the information which is sequentially conveyed.

Aside from considerations of the facets of chemical knowledge which may be conveyed by employing the present invention, the teaching device has marked advantages in the ease with which it may be manipulated by the instructor. A control panel which is readily accessible to the instructor, but substantially hidden from the view of the students, permits the device to be used in a number of different ways, according to the preferred organization of the instructor's lecture. Provision is made for easily and quickly repeating a given visual display if emphasis or review of the point under discussion is desired. In a practical aspect, the device is relatively compact and is sufficiently light to permit portability from one lecture room to another. Also, the device may be effectively utilized in either natural or artificial light, or even in darkness.

The physical structure of the present invention may be broadly described as comprising a large, flat monoplanar surface, such as, for example, a large rectangular display board, which surface carries a plurality of illuminable members representative of electrons and the various elements most frequently encountered in organic compounds; and control means facilitating the selective illumination of said illuminable members by the instructor in visually portraying the hereinbefore described concepts of organic chemistry. A salient feature of the invention is the particular individual configuration and arrangement relative to each other of the illuminable members in order to convey the most lucid understanding of a substantial number of principles of organic chemistry to a large body of observing students. Moreover, the illuminable members are precisely positioned to reduce duplication and permit the device to be relatively inexpensively constructed without sacrifice in the scope of its usefulness.

From the foregoing summary and description of the invention, it will have become apparent that it is a broad, major object of the present invention to provide a device for visually portraying knowledge of the chemistry of carbon compounds.

Another object of the invention is to provide an effective device for use in teaching organic chemistry, which device may be easily manipulated by an instructor simultaneously with the delivery of oral instruction.

A more specific object of the invention is to provide a visual teaching device for use in teaching the electronic, chemical and geometric character of both substituted and unsubstituted hydrocarbon molecules and radicals.

An additional object of the invention is to provide for visually demonstrating the electronic, atomic and molecular arrangements which exist in carbon compounds more effectively and easily than has previously been possible using devices such as charts or three-dimensional models.

A further object of the invention is to provide a visual teaching device for teaching organic chemistry, which teaching device is relatively simple and inexpensive to construct, is portable, and is characterized by a long and trouble-free operating life.

Other objects and advantages of the invention, in addition to those hereinbefore described, will become apparent from a further reading of the following detailed disclosure in conjunction with a perusal of the accompanying drawings which illustrate our invention.

Figure 1:
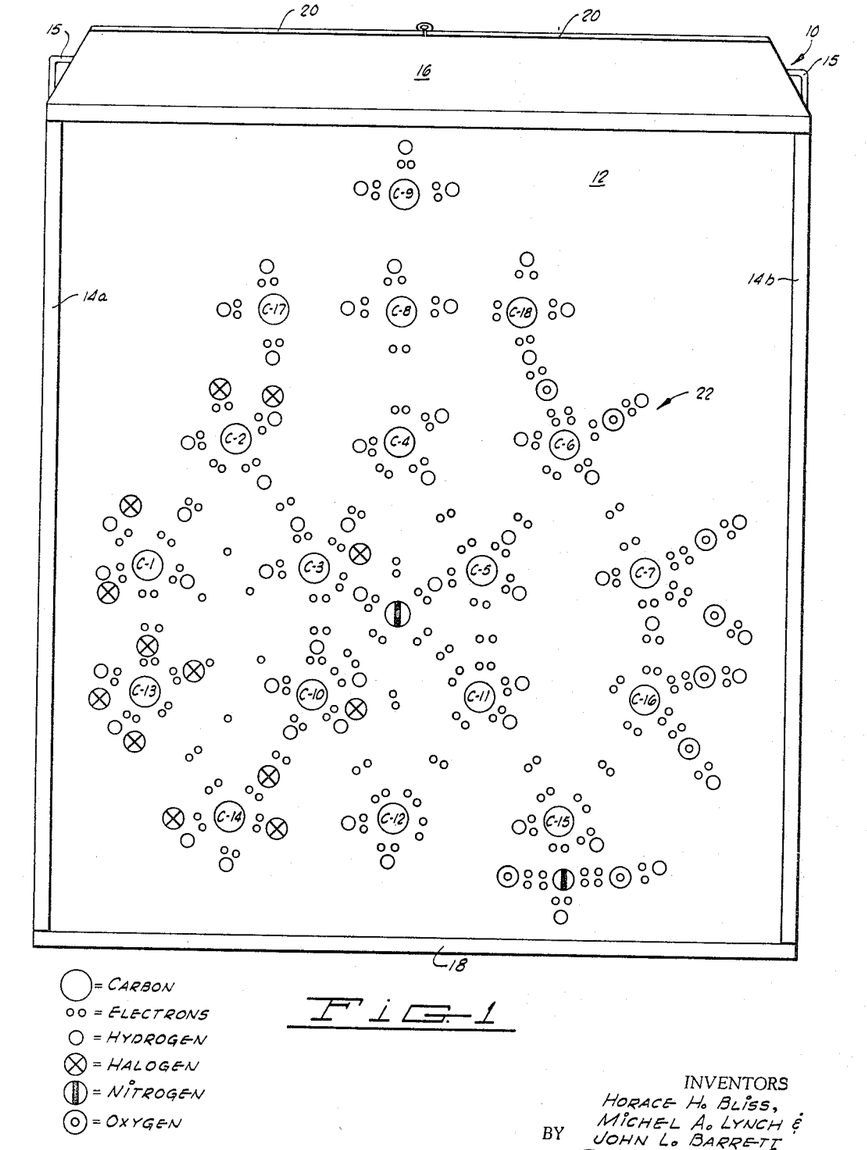
FIGURE 1 is an isometric view of a preferred embodiment of the teaching device of the present invention.

Referring now to the drawings in detail and, particularly, to FIGURE 1, reference character 10 designates generally the visual display teaching device of the invention. The teaching device 10 comprises a rectangular front panel 12 having a large surface area to facilitate unimpaired observation by students. The device 10 further includes a pair of opposed rectangular end panels 14a and 14b, and rectangular top and bottom walls 16 and 18, respectively. The panel 14b constitutes the control panel of the device and is illustrated in elevation in FIGURE 6. Each of the end walls 14a and 14b and the top and bottom walls 16 and 18 are secured at right angles to the front panel 12. A pair of contiguous rectangular back panels 20 are each hinged at one of their edges to each other and one of the panels is hinged at another edge to the end panel 14a. These back panels, when closed, complete the formation of the hollow, right parallelopiped geometric configuration of the teaching device 10. A pair of handles 15 secured to the end walls 14a and 14b facilitate the transport of the teaching device.

Displayed upon the large surface of the front panel 12 of the teaching device 10, are a plurality of illuminable members or indicia represented generally by reference character 22, which illuminable members are of different sizes and colors. In general, the illuminable members are of circular configuration and, in a preferred embodiment of the invention, constitute small, incandescent light bulbs. To the lower left of FIGURE 1, a legend has been set forth which indicates the atomic and sub-atomic particles which are represented by the various lights 22.

It will be preceived by reference to FIGURE 1 that the lights 22 are arranged in a definite pattern so that those lights representative of carbon atoms are surrounded by other light types which represent electrons, hydrogen atoms, halogen atoms, nitrogen atoms and oxygen atoms. The carbon atoms and the elements to which they may be bonded through electron pairs are geometrically arranged in a precise manner so as to permit a maximum amount of information concerning organic chemistry to be portrayed by selective illumination of the lights. In this regard, it will be noted that light bulbs representing the carbon atoms are arranged with one of these lights at the corners of three contiguous identically-shaped imaginary hexagons similar to the configuration of the carbon atoms in an anthracene molecule. This arrangement, together with the positioning of lights representing four carbon atoms, and their associated electron and hydrogen atoms across the top of the front panel 12, and the nitro group arrangement at the lower right-hand side of the front panel permits a great number of organic compounds to be represented by selective illumination of the lights, and also permits the concepts of unsaturation, the relationship between members of a homologous series of compounds, the electron structure in aromatic compounds and other concepts of organic chemistry to be portrayed.

We have determined that, in order to facilitate the visual distinguishing of the several light clusters and the rapid identification of the various compounds which are represented by certain patterns of light on the front panel 12, it is highly desirable to provide a thin sheet of translucent material 24 (see FIGURE 5) covering the exposed surfaces of the lights so that glare and diffusion of the light is reduced. An inexpensive material which may be employed is a substantially monoplanar sheet of white tissue or onionskin paper which is superimposed over all of the lights, or which may be used in association with each individual light. Other translucent materials can aslo be used.

Figure 2A:
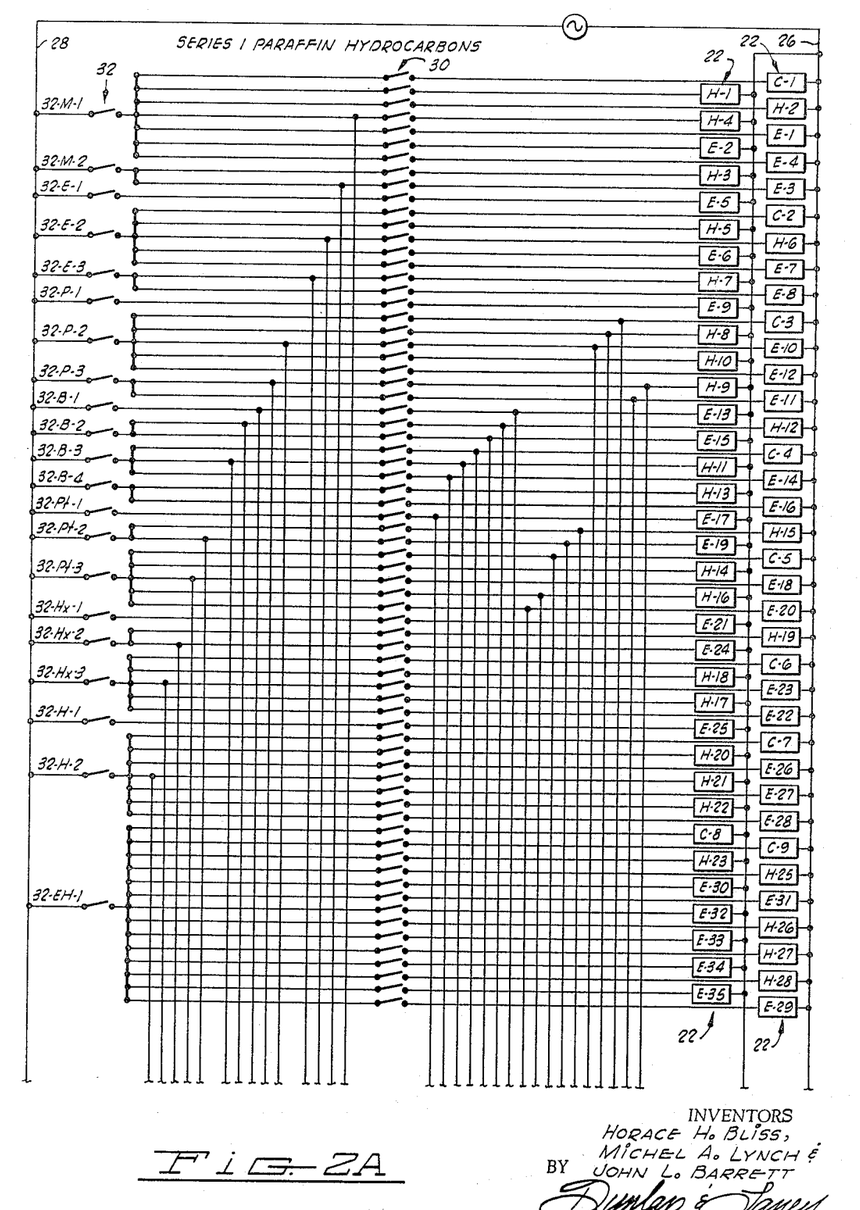
FIGURES 2A and 2B are diagrammatic representations of a portion of the electrical circuitry which is utilized in one embodiment of the present invention.
Figure 2B:
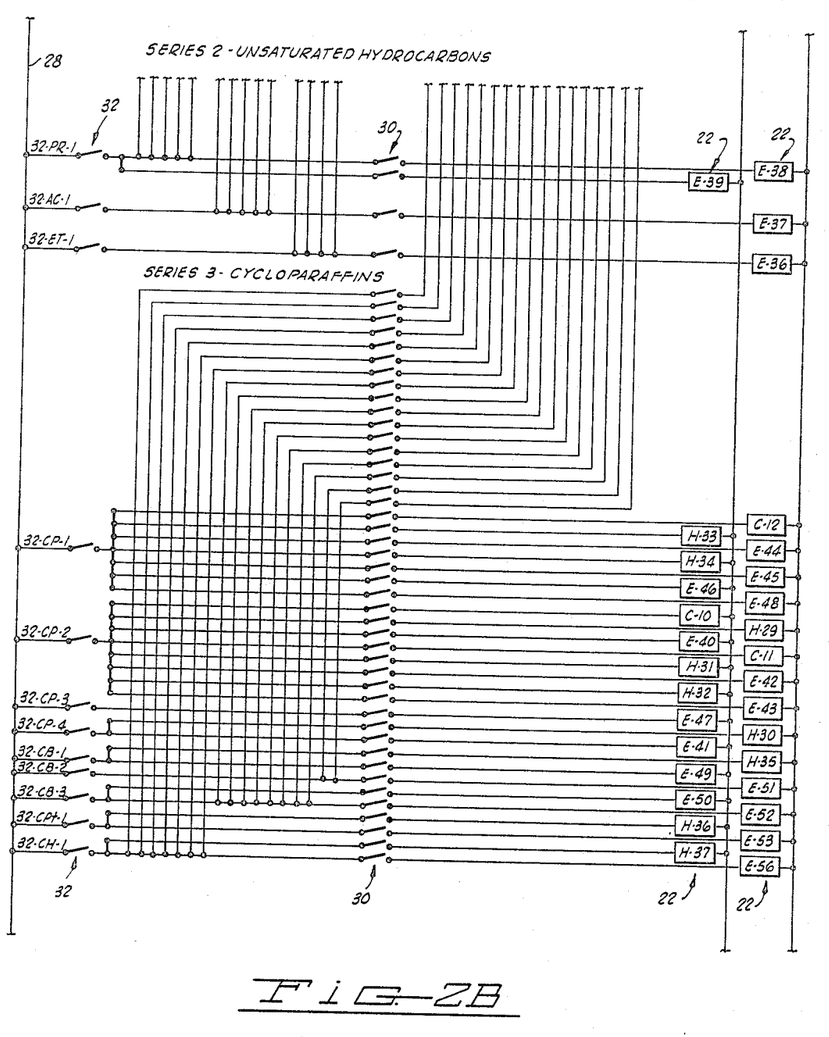

The electrical circuitry which is used for illuminating the lights 22 is schematically indicated in FIGURES 2A and 2B. A pair of main electrical busses 26 and 28 are connected to the positive and negative terminals, respectively, of a source of electromotive force. The remainder of the circuitry consists of the lights 22 on the front panel 12, a first group of switches, designated generally by reference character 30, and appearing in vertical alignment in the center of FIGURES 2A and 2B, and a second set of switches, designated generally by reference character 32, and appearing in vertical alignment at the left-hand side of FIGURES 2A and 2B.

For convenience and clarity of explanation, the switches 30 will hereinafter be termed "series switches," since, in order to illuminate successively a series of related organic compounds or radicals, one of the switches 30 must be closed for every light 22 which will be illuminated in the course of representing such compounds or groups. Since in practically every instance (with the exception of the portrayal of organic radicals), the electron lights are lighted in pairs, each pair of adjacent electron lights will hereinafter be referred to and treated as if it were a single light.

Each of the lights 22 (except those representing electrons) in FIGURES 1, 2A and 2B may be further designated by a symbol which includes a letter prefix indicative of the atom it represents and also a numerical suffix. Thus, the prefix H indicates a light representative of a hydrogen atom; C represents a light representative of a carbon atom; etc. The correlation between the atoms represented by the various lights and the symbols by which they are labeled may be understood by comparing the symbols associated with the lights shown in FIGURES 3 and 4 with the legend at the lower left-hand side of FIGURE 1. Each pair of adjacent electrons is designated by a symbol having as a prefix the letter E. It will now be seen that each of the series switches 30 may be further identified individually by the symbol of the light 22 to which it is connected. Thus, for example, the uppermost series switch 30 in FIGURE 2A is connected to light C-1 and may therefore be identified as series switch 30-C-1.

The switches 32 may, in order to aid in understanding the subsequent explanation of the invention, be termed "member switches," since one or more of these switches must be closed after the closure of a given set of series switches 30 in order to illuminate those lights 22 which are representative of each member organic compound or group within the respective series of compounds or groups. The member switches 32 may be individually further designated by the first letter of the first compound or group of the series which is represented by the lights illuminated when such series switches are first closed. Thus, if a member switch 32 is first closed in order to close the circuits to a group of lights 22 which, when illuminated, will visually portray or represent methane, a member of the paraffin hydrocarbon series, this member switch is designated 32-M. If two member switches must be closed to illuminate all the lights necessary to represent methane, these may be designated 32-M-1 and 32-M-2.

In considering the following explanation of the manner in which the electrical circuitry functions, it should be borne in mind that the electrical leads terminating at the bottom of FIGURE 2A are actually continued in FIGURE 2B, and that these two figures are to be considered together as a single integrated schematic electrical circuit diagram. It should further be pointed out that all of the electrical circuitry used in the invention is not illustrated, but that the unillustrated remainder of the circuitry is basically a repetition of that shown in FIGURES 2A and 2B, and its operation will be well understood from the explanation of the operation and function of that portion of the circuitry shown in these two figures.

Referring again now to FIGURE 1, let it be assumed that the instructor wishes initially to illustrate the paraffin series of hydrocarbon compounds. The simplest compound of this series is, of course, methane, represented by the structural formulas $CH_4$ or The methane molecule comprises a carbon atom bonded through four covalent electron pairs to four hydrogen atoms. The lights 22 which will be illuminated to represent this structure are the lights which carry symbols C-1, H-1, H-2, H-3, H-4, E-1, E-2, E-3 and E-4 in FIGURE 3, which figure depicts only those lights 22 illustrated in FIGURE 1 which will be used to visually portray the paraffin hydrocarbon series, and the unsaturated hydrocarbon series. To illuminate these lights, the instructor first closes each of the series switches 30 which are connected to all of the lights which will be illuminated at any time during the showing of the compounds methane through 4-ethylheptane in the paraffin series. These lights are, for clarity of explanation, all grouped together on the right side of FIGURE 2A. Next, the instructor closes switches 32-M-1 to illuminate lights C-1, H-1, H-2, H-4, E-1, E-2 and E-4 and also closes switch 32-M-2 to illuminate lights H-3 and E-3. The group of lights 22 which is illustrative of the compound methane is now illuminated on the face of panel 12. The student may see the atoms which make up the methane molecule and the manner in which four pairs of electrons are shared in four covalent bonds between the centrally located carbon atom and the four surrounding hydrogen atoms.

To illuminate those of the lights 22 which portray ethane, the next member of the paraffin hydrocarbon series, the series switches 30 for lights in the paraffin series are maintained closed, and then member switches 32-M-1, 32-E-1, 32-E-2, and 32-E-3 are closed. Member switch 32-M-2 is allowed to return to its normally open position since, in the compound methane, the fourth hydrogen atom represented by light H-3 which is attached to the single carbon atom of methane is dropped along with its corresponding shared electron pair, and this single carbon atom is, instead, bonded through a differently positioned electron pair to the second carbon atom represented by light C-2 which is present in ethane. It will be apparent that, in proceeding from the visual portrayal of the methane molecule to the ethane molecule, the lights 22 on the front panel 12 of the device of the invention are re-utilized to the maximum possible extent in the sequential illustration of the two compounds. Thus, to illuminate the ethane molecule, it is only necessary to add a total of eight new lights which were not illuminated in the illumination of the methane molecule. This re-utilization, or repeated utilization, of some of the lights 22 which have been previously employed in portraying lower molecular weight compounds is characteristic of the present invention and is considered to be one of its novel and highly useful features.

After illuminating those lights 22 which are representative of the ethane molecule, the instructor may proceed to sequentially illustrate the structural configuration of the propane, butane, pentane, hexane, heptane and 4-ethylheptane paraffin hydrocarbon molecules by closing the appropriate member switches 32. All of the member switches which are utilized in showing this series of paraffin hydrocarbon compounds are shown at the left-hand side of FIGURE 2A. The groups of these member switches 32 which are closed for illuminating a given compound are tabulated in Table I below, as are the lights 22 which are lighted to illustrate each member compound in the series. It will be understood, of course, that once the instructor has closed all of the series switches which are in the circuits leading to the lights which will be utilized in showing the various member compounds in the paraffin series (all of those series switches 30 which are presented in a vertically aligned column in the center of FIGURE 2A), he may then disregard further manipulation of the series switches until those member compounds of the series which he desires to illuminate have been portrayed, and it is desired to consider next a different series of organic compounds.

TABLE I.—SERIES 1—SATURATED PARAFFIN HYDROCARBONS

| Members of Series | Member Switches Closed | Lights Lighted |
| --- | --- | --- |
| Methane | 32-M-1, 32-M-2 | C-1, H-1, H-2, H-3, H-4, E-1, E-2, E-3, E-4. |
| Ethane | 32-M-1, 32-E-1, 32-E-2, 32-E-3. | C-1, C-2, H-1, H-2, H-4, E-1, E-2, E-4, E-5, H-5, H-6, H-7, E-6, E-7, E-8. |
| Propane | 32-M-1, 32-E-1, 32-E-2, 32-P-1, 32-P-2, 32-P-3. | C-1, C-2, H-1, H-2, H-4, E-1, E-2, E-4, E-5, H-5, E-6, C-3, H-6, E-7, E-9, H-8, E-10, H-9, E-11, H-10, E-12. |
| Butane | 32-M-1, 32-E-1, 32-E-2, 32-P-1, 32-P-2, 32-B-1, 32-B-2, 32-B-3, 32-B-4. | C-1, C-2, H-1, H-2, H-4, E-1, E-2, E-4, E-5, H-5, E-6, C-3, H-6, E-7, E-9, H-8, E-10, H-10, E-12, C-4, H-11, E-14, H-12, E-15, H-13, E-16, E-13. |

TABLE I.—SERIES 1—SATURATED PARAFFIN HYDROCARBONS—Continued

| Members of Series | Member Switches Closed | Lights Lighted |
| --- | --- | --- |
| Pentane | 32-M-1, 32-E-1, 32-E-2, 32-P-1, 32-P-2, 32-B-1, 32-B-2, 32-B-3, 32-Pt-1, 32-Pt-2, 32-Pt-3. | C-1, C-2, H-1, H-2, H-4, H-5, E-1, E-2, E-4, E-5, E-6, C-3, H-6, E-7, E-9, H-8, E-10, H-10, E-12, C-4, H-11, E-14, H-12, E-15, E-13, E-17, C-5, H-14, E-18, H-15, E-19, H-16, E-20. |
| Hexane | 32-M-1, 32-E-1, 32-E-2, 32-P-1, 32-P-2, 32-B-1, 32-B-2, 32-B-3, 32-Pt-1, 32-Pt-3, 32-Hx-1, 32-Hx-2, 32-Hx-3. | C-1, C-2, H-1, H-2, H-4, H-5, E-1, E-2, E-4, E-5, E-6, C-3, H-6, E-7, E-9, H-8, E-10, H-10, E-12, C-4, H-11, E-14, H-12, E-15, E-13, E-17, C-5, H-14, E-18, E-21, C-6, H-17, E-22, H-18, E-23, H-19, E-24, H-16, E-20. |
| Heptane | 32-M-1, 32-E-1, 32-E-2, 32-P-1, 32-P-2, 32-B-1, 32-B-2, 32-B-3, 32-Pt-1, 32-Pt-3, 32-Hx-1, 32-Hx-3, 32-H-1, 32-H-2. | C-1, C-2, H-1, H-2, H-4, H-5, E-1, E-2, E-4, E-5, E-6, C-3, H-6, E-7, E-9, E-12, H-8, E-10, H-10, C-4, H-11, E-14, H-12, E-15, E-13, E-17, C-5, H-14, E-18, E-21, C-6, H-17, E-22, H-18, E-23, E-25, C-7, H-20, E-26, H-21, E-27, H-22, E-28. |
| 4-ethylheptane | 32-M-1, 32-E-1, 32-E-2, 32-P-1, 32-P-2, 32-B-1, 32-B-3, 32-Pt-1, 32-Pt-3, 32-Hx-3, 32-H-1, H-2, 32-EH-1. | E-33, H-27, E-34, H-28, E-35, C-1, C-2, H-1, H-2, H-5, E-1, E-2, E-4, E-5, E-6, C-3, H-6, E-7, E-9, H-8, E-10, H-10, E-12, C-4, H-11, E-14, E-13, E-17, C-5, H-14, E-18, E-21, C-6, H-17, E-22, H-18, E-23, E-25, C-7, H-20, E-26, H-21, E-27, H-22, E-28, C-8, C-9, E-29, H-23, E-30, H-25, E-32, H-26, H-16, E-20, E-31. |

Figures 3, 4, 5, 6:
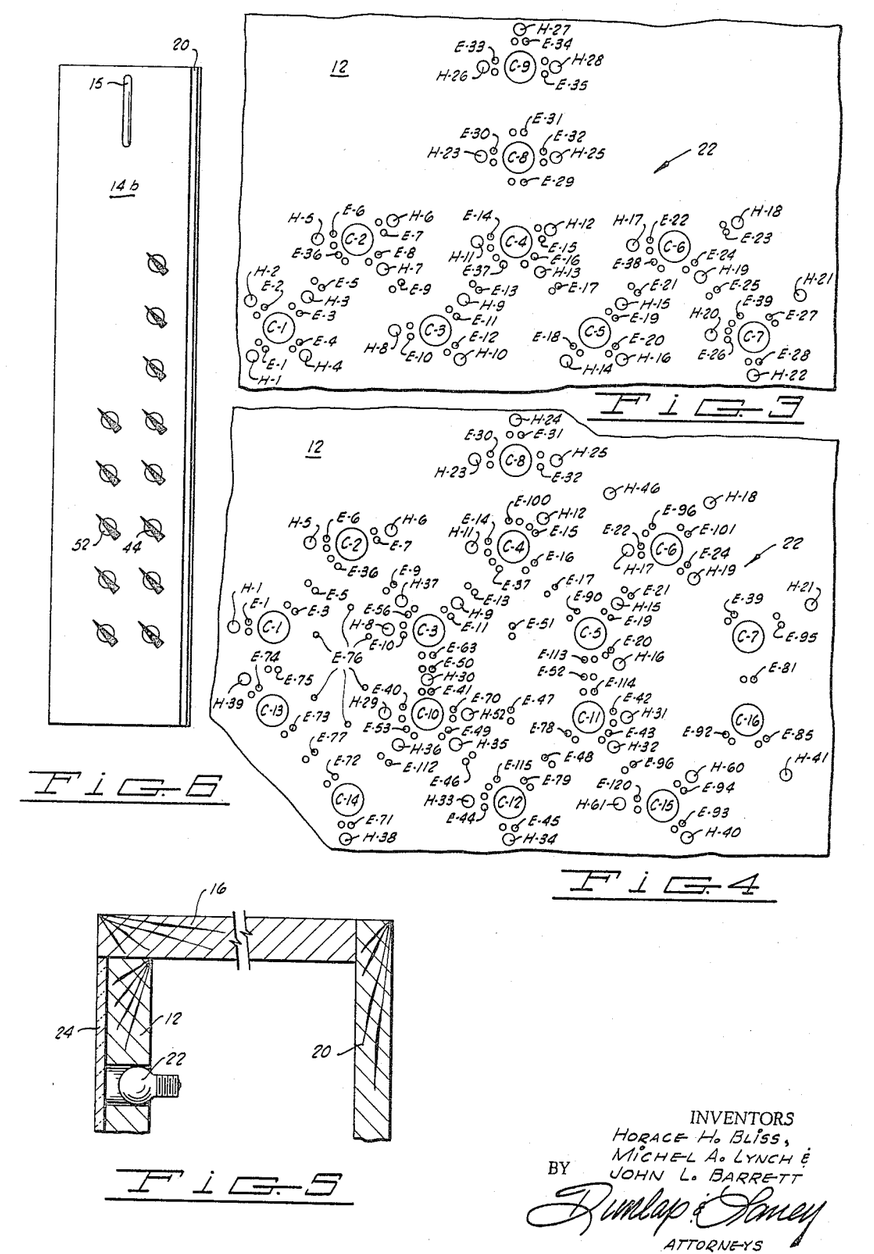
FIGURE 3 is a view in elevation of a group of the lights which are used in a preferred embodiment of the invention to represent selected members of the paraffin series of hydrocarbon compounds and a series of unsaturated organic compounds.
FIGURE 4 is a schematic illustration of a group of lights which are used in a preferred embodiment of the invention to represent a series of cycloparaffin compounds and a series of aromatic compounds.
FIGURE 5 is a vertical sectional view through a portion of the teaching device shown in FIGURE 1.
FIGURE 6 is an end view of the teaching device shown in FIGURE 1 and illustrating the control panel of the device.

In referring to the arrangement of the lights 22 on the front panel 12 as shown in FIGURES 1 and 3, and in comparing the various lights there depicted with the pattern of light illumination set forth in Table I, it may be seen that several concepts may be visually portrayed for observation by the students during the illumination of lights representative of the compounds in the paraffin series. Thus, for example, the straight chain saturated paraffin hydrocarbon compounds which are formed by carbon atoms C-1 through C-7 and their surrounding hydrogen atoms and electrons serve to roughly illustrate to the students the angles which are formed between carbon atoms bound to each other by a single bond. In the actual construction of the device, the angles defined by lines drawn between three adjacent carbon atom lights in this series are actually somewhat larger than that shown in FIGURES 1 and 3 and approaches more nearly the 109° angle which has been determined to exist between the bonds linking adjacent carbon atoms in compounds of this type.

Another concept which is visually portrayed to the student by the described manner of sequentially presenting compounds of the paraffin series of hydrocarbons is the mathematical relationship or general type formula which defines the ratios of carbon to hydrogen atoms in each of these compounds. Thus, as the compounds are successively illuminated, it may be perceived that, as a new carbon atom is added to the chain to portray the compound which is next highest in molecular weight in the series, a net gain of two hydrogen atoms occurs since the new carbon atom carries with it three hydrogen atoms and the preceding carbon atom loses one hydrogen atom and the bond between the latter hydrogen atom and such previous carbon atom is replaced by an electron pair linking the terminal and adjacent carbon atoms of the chain. Thus, the student may easily see the derivation of the type formula $C_nH_{2n+2}$, in which $n$ is the number of carbon atoms present in the particular paraffin compound. The tetravalency of carbon is easily visualized, as is the manner in which the carbon atom shares electron pairs with either the hydrogen or carbon atoms to which it is bound. It may be further seen that consecutive members of the paraffin series of hydrocarbons differ from each other in each case by a carbon atom and two hydrogen atoms.

A second series of organic compounds which may be visually portrayed by the device of the present invention is that of the unsaturated hydrocarbons. The lights on the board have been arranged to permit the convenient sequential showing of three of these compounds which are, respectively, ethylene, acetylene and propadiene. It is thus seen that the series of unsaturated hydrocarbons which may be depicted by sequential illumination of the lights has been selected to permit portrayal of a typical olefin, a typical acetylenic compound having a triple bond therein, and a typical diolefin having a pair of double bonds in the same molecule.

An understanding of the manner in which the proper lights 22 on the panel 12 are wired in the electrical circuitry to facilitate their selective illumination to represent these three compounds may be gained by reference again to FIGURES 2A and 2B. Upon the instructor's conclusion of the lecture regarding the paraffin series of hydrocarbon compounds, both the member switches 32 used to illuminate various members of the paraffin series and also the series switches 30 which are used for this purpose are opened. The instructor will then close all of the series switches 30 which are connected to lights 22 which will be illuminated in illustrating the various members of the unsaturated series. Many of these lights will, of course, be some of the same lights which were utilized to show various members of the parafin hydrocarbon series as will subsequently become evident when reference is made to Table II and FIGURE 3. However, several new lights 22 which were not employed in showing the saturated paraffinic compounds must be illuminated to show the unsaturated hydrocarbons. These are the lights E-36, E-37, E-38 and E-39. Each of these latter lights has connected to it a series switch 30 in the same manner as series switches were connected to each of the lights which were illuminated during the showing of the paraffin hydrocarbon series. The selective closure of the various series switches when the instructor is preparing to demonstrate successively the members of one series of organic compounds may be conveniently and economically accomplished through the use of ganged rotary switches in a manner described in greater detail hereinafter.

After the series switches 30 which are associated with all of the lights which are to be illuminated in portraying the compounds ethylene, acetylene and propadiene have been closed, the instructor then closes the member switch 32-ET-1. The closure of this switch has the effect of lighting those lights which must be illuminated to represent the compound ethylene. The lights which are illuminated at such time are tabulated in Table II hereinafter and their relative position on the panel 12 may be understood by referring to FIGURE 3.

To illuminate the lights 22 necessary to the representation of the compound acetylene, the instructor opens switch 32-ET-1 and closes member switch 32-AC-1. Upon the closure of member switch 32-AC-1, those lights 22 which are listed in Table II as being lighted to show the compound acetylene will become illuminated. These lights are also identified in FIGURE 3.

The lights 22 which are illuminated to show the diolefin propadiene are illuminated by closing switch 32-PR-1 while switches 32-AC-1 and 32-ET-1 are open. These lights are tabulated in Table II and shown in FIGURE 3.

It will again be observed by comparison of those lights 22 which are lighted during the showing of the several members of the unsaturated hydrocarbon series with the lights 22 which are illuminated during the showing of the paraffin hydrocarbons that maximum conservation of space and saving of expense have been achieved by the repeated utilization of a maximum number of the lights.

TABLE II.—SERIES 2—UNSATURATED HYDROCARBONS

| Members of Series | Member Switches Closed | Lights Lighted |
| --- | --- | --- |
| Ethylene | 32-ET-1 | C-1, C-2, H-1, E-1, H-4, E-4, E-3, E-36, H-7, E-8, H-6, E-7. |
| Acetylene | 32-AC-1 | C-3, C-4, H-8, E-10, E-11, E-13, E-37, H-12, E-15. |
| Propadiene | 32-PR-1 | C-5, C-6, C-7, H-14, E-18, E-19, H-16, E-20, E-38, E-24, H-22, E-28, H-20, E-26, E-39. |

In the illustration of the three unsaturated hydrocarbons which may be visually portrayed in the manner described, the student is enabled to understand the differences and relationships between the electron arrangement in double bonds, as opposed to triple bonds, in organic compounds, and also to see the manner in which a total of either four or six electrons is shared between adjacent carbon atoms in the formation of the double or the triple bond, respectively. It may also be perceived that olefinic unsaturation is not limited to one occurrence per hydrocarbon molecule, but may occur a plurality of times, as evidenced by the two occurrences of olefinic unsaturation in the propadiene molecule. The student is also permitted by the visual portrayal of the mono-olefin compound ethylene to perceive that the generalized empirical formula of such compounds may be written as $C_nH_{2n}$. He may observe that the corresponding formula for the di-olefins is $C_nH_{2n-2}$. It may also be inferred from the demonstration of the acetylene and the propadiene molecules, that di-olefinic compounds are isomeric with acetylenic compounds—that is, the same generalized empirical formula may be written for both types of compounds.

A third series of organic compounds which is demonstrable by the teaching device of the present invention and which is visually represented through the use of the circuitry depicted in FIGURES 2A and 2B is that of the cycloparaffinic hydrocarbons. The members of this series which can be visually portrayed with the lights 22 which are available for such portrayal on the face of the front panel 12 and which are specifically illustrated in FIGURE 4 are cyclopropane, cyclobutane, cyclopentane and cyclohexane. To illuminate the lights 22 which are representative of these compounds, the instructor will first close the series switches 30 which are associated with each of the lights which will be utilized at any time in portraying the various members of the series. By reference to FIGURES 2A, 2B, 3 and 4 as well as to Table III below, it will be apparent that a great many of the lights which have been employed in illustrating the paraffin series and the unsaturated hydrocarbon series are utilized again in visually portraying the cycloparaffin compounds. It is again pointed out that though, from the tabulation of lights 22 which are to be illuminated, and the substantial number of series switches which are depicted in FIGURES 2A and 2B it would appear that a substantial amount of physical manipulation would be required on the instructor's part, we have determined that the closure of all of the series switches which are to be closed prior to the demonstration of any series of compounds may be accomplished with only a single or at most two physical manipulations by the instructor. This is accomplished through the use of ganged rotary switches in a manner hereinafter more fully described.

After the instructor has closed the series switches 30 associated with the lights which are to be illuminated in the course of presenting the cycloparaffin compounds, the instructor will sequentially close the member switches 32 as required to sequentially portray each of the hereinbefore described compounds of this series. Thus, in illustrating the lowest molecular weight member of the series, cyclopropane, the instructor will close switches 32-CP-1, 32-CP-2, 32-CP-3 and 32-CP-4 with the result that lights representing the structure of cyclopropane will be illuminated on the panel 12. The member switches which are closed to illuminate the three remaining compounds in this series and the lights which are lighted thereby will be easily understood by reference to FIGURES 2A and 2B, and to Table III.

TABLE III.—SERIES 3—CYCLOPARAFFINS

| Members of Series | Member Switches Closed | Lights Lighted |
| --- | --- | --- |
| Cyclopropane | 32-CP-1, 32-CP-2, 32-CP-3, 32-CP-4. | C-12, H-33, E-44, H-34, E-45, E-46, E-18, C-10, H-29, E-40, H-30, E-41, C-11, H-31, E-42, H-32, E-43, E-47. |
| Cyclobutane | 32-CB-3, 32-CP-2, 32-CP-3, 32-CB-1, 32-CB-2. | H-35, E-49, C-10, C-11, H-29, E-40, E-47, H-31, E-42, C-3, E-50, H-9, E-11, H-8, E-10, C-5, H-16, E-20, H-15, E-19, E-51, E-52, H-32, E-43. |
| Cyclopentane | 32-CP-1, 32-CP-2, 32-CB-3, 32-CB-2, 32-CPt-1. | C-12, H-33, E-44, E-45, H-34, E-46, E-48, C-11, H-31, E-42, H-32, E-43, C-10, E-40, E-11, H-29, E-53, H-36, E-50, E-52, C-3, H-8, E-10, C-5, H-16, E-20, H-15, E-19, E-51, H-9. |
| Cyclohexane | 32-CP-1, 32-CP-2, 32-CPt-1, 32-CB-3, 32-CH-1. | C-12, H-33, E-44, H-34, E-45, E-46, E-48, C-11, H-31, E-42, H-32, E-43, C-10, H-29, E-40, H-36, E-53, E-50, E-52, C-3, H-8, E-10, H-37, E-56, C-5, H-15, E-19, H-16, E-20, E-13, C-4, H-11, E-14, H-12, E-15, E-17. |

From the selective illumination of lights arranged on the panel 12 in the pattern shown in FIGURE 4, the student is able to visualize the cyclic or ring-like structure of the cycloparaffins, the manner in which these compounds differ both in geometric configuration and in atomic make-up from the straight and branched chain paraffins demonstrated in the first described series, and the fact that the cycloparaffins are isomeric with, or have the same generalized empirical formula $(C_nH_{2n})$ as, the mono-olefinic compounds. The student is also able to see the manner in which the several members or homologues of this series are related, and will understand that, in each case, one member of the homologous series differs from an adjacent member in the series by the addition or subtraction of a carbon atom and two hydrogen atoms.

From the foregoing discussion, it is believed that it will now be understood how the invention is utilized to portray a large amount of information with a maximum degree of clarity. The portion of the electrical circuitry which is utilized in the invention, and which has been portrayed in FIGURES 2A and 2B, is that which is employed for sequentially illuminating lights 22 representing three different series of organic compounds, and the various related members within each series. It will be understood, however, that by virtue of the precise geometric arrangement of the lights 22 on the panel 12, it is possible, through the use of circuitry substantially identical in principle with that shown in FIGURES 2A and 2B, to portray a large number of additional types of organic compounds, grouping such compounds into series of compounds having some related characteristic or property, and utilizing a minimum number of lights to facilitate the visual portrayal of all of the compounds in such series.

Table IV below sets forth, for example, a number of the series of compounds, and the members or individual compounds within each series which can be portrayed utilizing the device. By way of further example, in the case of the aromatic hydrocarbon series, the table lists the various lights which will be illuminated in the course of portraying various members of this series, and the position of these lights relative to each other and to other lights on the panel 12 may be discerned by reference to FIGURE 4.

It will be of interest to the reader to note that the arrangement of the lights 22 on the panel 12 is such as to permit the older and perhaps more conventional theory concerning the arrangement of electrons in aromatic ring structures to be visualized, and also to permit the student to observe the more recently evolved so-called "pi" electron theory of aromatic ring structures. The pi electrons are represented by the lights designated by reference character E-76 and, as is understood under the pi electron theory concerning the arrangement of electrons in the ring structure or aromatic compounds.

TABLE 4.—AROMATIC HYDROCARBONS

Member of Series—Lights Lighted:
Benzene—C-1, C-2, C-3, C-10, C-14, C-13, H-1, H-6, H-9, H-52, H-38, H-39, E-73, E-74, E-75, E-1, E-3, E-36, E-7, E-9, E-11, E-63, E-41, E-112, E-71, E-70, E-72.
$\pi$-electron Benzene—C-1, C-2, C-3, C-10, C-14, C-13, H-1, E-1, E-5, E-7, H-6, E-9, H-9, E-11, E-50, E-49, H-35, E-112, H-38, E-71, E-77, E-74, H-39, E-75, E-76 (6 electrons in $\pi$ arrangement).
Naphthalene—C-1, C-2, C-3, C-10, C-14, C-13, C-4, C-5, C-11, C-12, H-1, H-5, E-63, E-41, E-1, E-3, E-36, E-73, E-9, E-6, E-63, E-41, E-112, E-71, E-72, H-12, E-15, H-16, E-20, H-31, E-42, E-52, E-78, E-79, H-34, E-45, E-46, E-90, H-38, H-39, E-74, E-75.
Anthracine—C-1, C-2, C-3, C-10, C-14, C-13, C-4, C-5, C-11, C-12, C-15, C-16, C-7, C-6, H-1, H-5, H-34, H-38, E-74, E-46, E-90, E-1, E-3, E-36, E-6, E-9, E-63, E-41, E-112, E-92, E-93, H-12, E-15, E-52, E-71, E-94, H-34, E-45, E-46, H-46, E-97, E-24, E-39, H-21, E-95, H-41, E-85, E-81, H-40, E-79, E-75, E-72, E-73, E-71, E-78, E-52, H-39, E-96.
O-xylene—C-3, C-4, C-5, C-8, C-10, C-11, C-12, C-6, H-17, E-22, H-18, H-19, E-24, E-21, E-113, E-114, H-31, E-42, E-48, H-34, E-34, E-115, E-49, H-29, E-40, E-50, H-8, E-10, E-11, E-37, E-17, H-23, E-30, H-24, E-31, H-25, E-32, E-101, E-100.
M-xylene—C-3, C-4, C-5, C-8, C-10, C-11, C-12, C-15, H-29, H-8, H-23, H-24, H-25, H-16, H-60, H-40, H-61, H-34, E-40, E-50, E-10, E-11, E-37, E-100, E-30, E-31, E-32, E-17, E-20, E-113, E-114, E-96, E-94, E-93, E-120, E-48, E-45, E-115, E-49.
Hydrocarbon radicals.—Methyl, ethyl, n-propyl, isopropyl, primary-butyl, secondary-butyl, tertiary-butyl.
Nitrogen containing organic compounds.—Ethylamine, analine, nitrobenzene, tri-methylamine, glycine.
Oxygen containing organic compounds.—Formic acid, acetic acid, propionic acid, diethyl ether, ethyl acetate, oxalic acid, nitrobenzene, glycerol, glycine, o-catechol, phenol, acetaldehyde, acetone, methyl ethyl ketone.
Halogen containing organic compounds.—Carbon tetrahalide, methyl halide, chloroform, methyl dihalide, halobenzene.

In a preferred embodiment of the invention, the electrical circuitry and switching elements which are employed to accomplish the selective and sequential illumination of the lights 22 in the manner hereinbefore described preferably include the use of ganged rotary switches. We have found that the use of a switching arrangement of this type permits the lights to be illuminated as desired with a minimum of physical manipulation by the instructor, and allows the teaching device to be constructed in a relatively economical manner.

Figure 7:
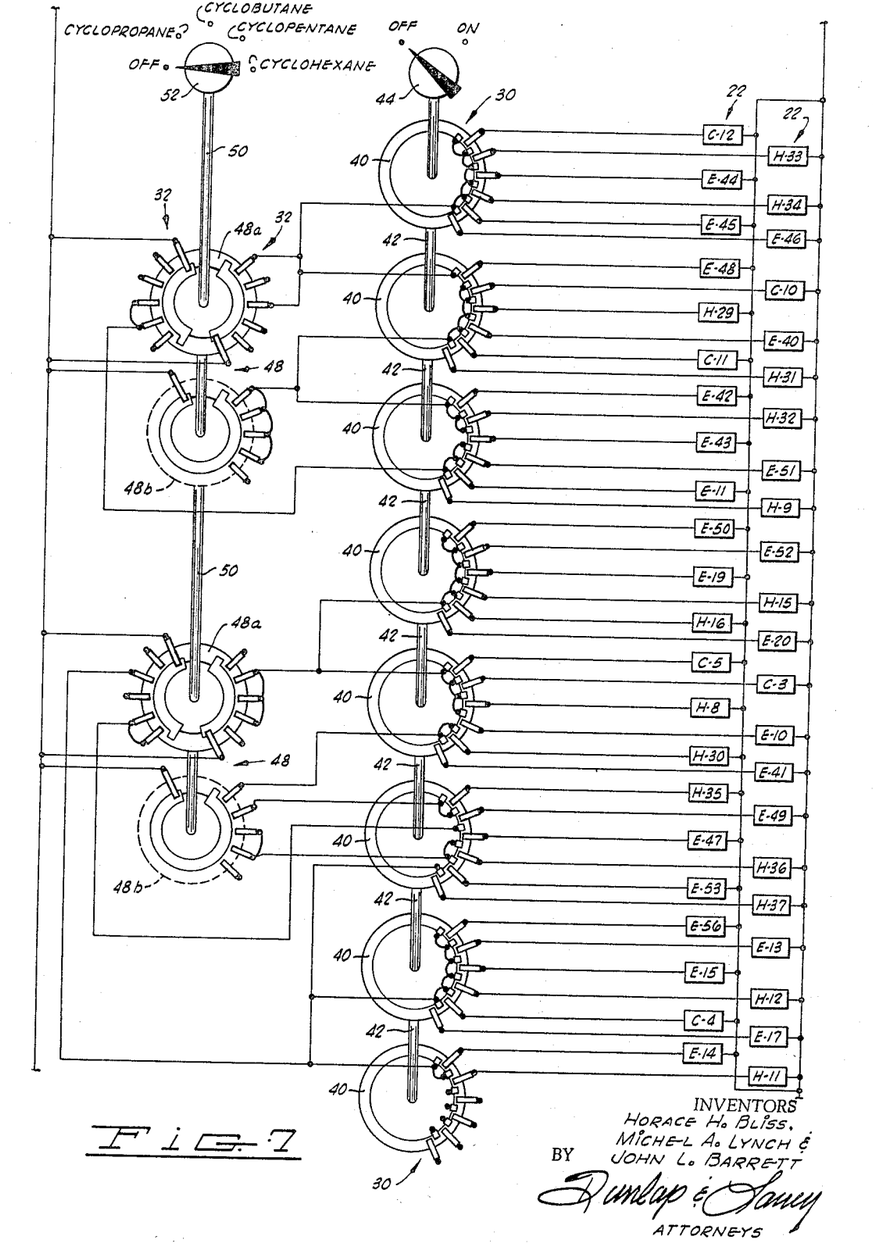
FIGURE 7 is a different type of electrical circuit diagram from that shown in FIGURE 2 and is included for the purpose of more clearly illustrating the manner in which a preferred embodiment of the invention is constructed to reduce the cost of the device and facilitate ease of operation by the instructor.

The use of rotary switches to accomplish the desired illumination of the lights 22 is exemplified by the circuitry illustrated in FIGURE 7 of the drawings. In referring to FIGURE 7, it will be observed that the circuitry and associated ganged wafer switches there shown are utilized for the purpose of illuminating the several compounds which are illustrative of the cycloparaffin series of hydrocarbons, and which have been described above as Series 3. The series switches 30, one of which is associated with each of the lights which will be lit in lighting the various compounds of this series, are all included on the eight, six pole, two position wafers 40 which are all mounted on the shaft 42. Since there are a total of 44 lights illuminated in the visual portrayal of this series, the eight, six pole, two position wafers provide a total of 48 ON–OFF series switches, enough to permit the instructor to close all of the series switches 30 necessary to the illumination of the cycloparaffin series by one snap of the control knob 44 mounted at the head or top of the shaft 42.

The member switches 32 which are illustrated in the circuit diagrams of FIGURES 2A and 2B may also, like the series switches 30, be conveniently and economically embodied in a plurality of wafers mounted in gangs upon a single shaft and this arrangement is depicted at the left of FIGURE 7. We have found it convenient to utilize a pair of three pole, five position wafers 48 on the shaft 50 to close the circuits to the lights which illustrate the various member compounds in the cycloparaffin series. In FIGURE 7, the upper surface 48a of each of the two wafers 48 is represented by a full line circle, with such upper surface carrying two of the three poles on each wafer. The lower surface 48b of each wafer 48 is represented by the dashed line circle, and carries the third pole of the wafer. The four members of the cycloparaffin series which may typically be illustrated by the arrangement of lights 22 on the panel 12 as hereinbefore described are sequentially illustrated by moving the control knob 52 at the head of the shaft 50 in a clockwise direction to sequentially move the three poles of the two wafers to four sequential positions in which the circuits necessary to the illumination of the proper lights are closed. The way in which these circuits are closed by rotation of the cycloparaffin member switch knob 52 will be understood by referring to FIGURE 7 conjunctively with FIGURES 2A and 2B.

In order to facilitate the ease with which the instructor may operate the device of the invention, and simultaneously, to prevent such operation from unduly distracting the attention of the students from the lights 22 on the front panel 12 of the device, the control knobs, such as the knobs 44 and 52, which are secured to the heads of the shafts carrying the various wafers used in selectively illuminating the lights on the panel are positioned on the end panel 14b of the device. The manner in which the control knobs are positioned on the end panel 14b is illustrated in FIGURE 6. In referring to this figure of the drawings, it will be perceived that the arrangement of the control knobs in such that the instructor will have no difficulty in closing the proper circuits in the operation of the device, and that such operation by the instructor may be done in an unobstrucive and non-distractive manner.

Figure 8:
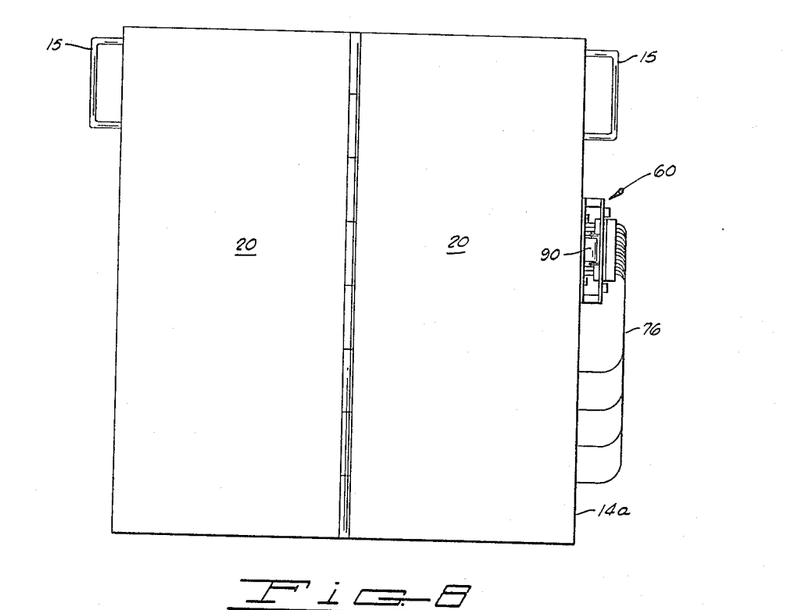
FIGURE 8 is a view in elevation from the rear of the teaching device of the present invention illustrating a modified embodiment of the invention in which a card reaching switch device is employed instead of a series of independently manipulated rotary switches.
Figure 9:
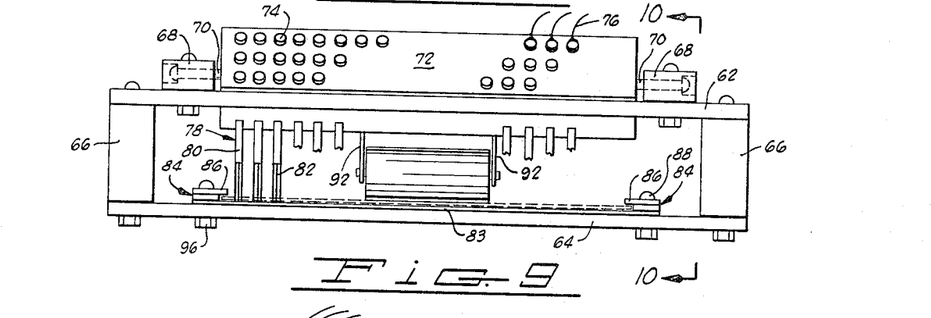
FIGURE 9 is a view in elevation of the card reading device as it appears when viewed from the front side of the teaching device.
Figure 10:
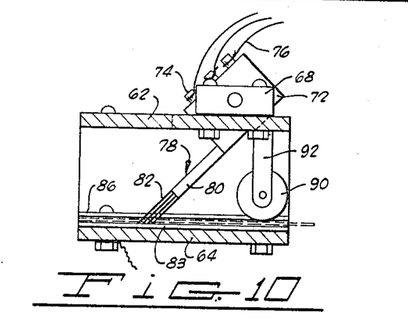
FIGURE 10 is a view in section taken along line 10—10 of FIGURE 9.

An alternative embodiment of the invention is illustrated in FIGURES 8, 9 and 10. In this embodiment of the invention, a card reading switching device is used to effect the selective illumination of the lights used to represent different organic compounds and radicals rather than a multiplicity of rotary switches of the type hereinbefore described. The card reading switching device is designated generally by reference character 60. The card reading switching device 60 is mounted on end panel 14a between the top and bottom walls, 16 and 18 respectively. As most clearly illustrated in FIGURES 9 and 10, the card reading device includes a pair of parallel plates 62 and 64 spaced from each other by suitable spacer elements 66. A pair of journal blocks 68 are mounted on the upper plate 62 and support stub shafts 70 which extend from the opposite ends of an electrical contact panel 72.

The electrical contact panel 72 is provided with a plurality of exposed terminals 74 on the upper surface thereof, which terminals are adapted to be connected to suitable electrical leads 76 which extend to the various illuminable members or lights 22 on the large surface of the front panel 12 of the teaching device 10. The number of terminals 74 provided will correspond to the minimum number of illuminable members or groups of illuminable members which must be lighted during the full utilization of the teaching device to sequentially show the complete array of organic compounds which it may be desired to demonstrate. Suitable electrical connections (not shown) are made through the contact panel 72 between the terminals 74 and a plurality of brush assemblies designated generally by reference character 78. The brush assemblies 78 each include a relatively rigid shank portion 80 which receives and supports a plurality of flexible bristles or brushes 82 which extend downwardly therefrom into abutting contact with an electrically conductive metallic plate 83 which is mounted on the lower plate 64.

For the purpose of guiding a punched card through the card reading device 60, a pair of lateral guide members 84 are secured to the upper surface of the plate 64 on each side of electrically conductive plate 83 and are spaced transversely from each other by a distance corresponding approximately to the width of a punched card which is to be passed through the device. This width will also correspond approximately to the width of the contact panel 72 so that all of the brush assemblies 78 will extend into contact with the electrically conductive plate 83 positioned intermediate the card guides 84. Each of the card guides 84 includes an overhanging plate 86 which is spaced from the plate 83 and adapted to retain a card passed through the device in contact with the plate 83. The card guides 84 are each secured in position by a suitable electrically conductive post 88, at least one of which passes through, and is in contact with, the electrically conductive plate 83.

A suitable roller 90 is rotatably journaled at each of its ends in supporting brackets 92 which are secured to, and extend downwardly from, the upper plate 62. The peripheral surface of the roller is spaced upwardly from the metallic plate 83 by a distance corresponding approximately to the thickness of one of the punched cards which is passed through the card reading device.

In the operation of the card reading device 60, an instructor selects a punched or apertured card (not shown) which has been perforated according to a pattern designed to permit certain of the brushes 82 to extend through the apertures therein into contact with the conductive plate 83. The brushes 82 which extend through the apertures of the card in this manner are those which are connected through the terminals 74 to illuminable indicia 22 representative of a particular organic compound or radical which it is desired to illuminate. Thus, by selection of a particular card, the instructor may effect the illumination of any particular compound or radical which it is his purpose to explain or discuss.

The selected perforated card is then inserted in the channel provided by the card guides 84 at the side of the card reading device 60 which carries the roller 90. As the card is pushed into position within the card reading device 60, the appropriate brushes 82 extend through the apertures in the card and contact the conductive plate 83. The circuit is thus made through the brushes in contact with the plate 83 and the terminals 74 connected to these brushes to certain of the illuminable members or lights 22 which must be illuminated to portray the selected organic compound.

It will be apparent from the discussion of the card reading device 60 that it is necessary to include in the electrical circuitry associated therewith, a master toggle switch or other on-off switch device (not shown) for opening the circuit which is made through the brushes 82, terminals 74 and conductive plate 83 when no card is in position in the device. In other words, the initial step taken by the instructor in using the card reading device will normally be to insert the card in position and then make the circuit through those brushes 82 which are in contact with the plate 83 by throwing the master toggle switch.

The advantage of the card reading device 60 is that the teaching device can be constructed at less expense than is required when a plurality of rotary switches are employed. Moreover, use of the device by an instructor who may be pre-occupied with textbooks, charts or other teaching materials is facilitated since the selection and use of the perforated cards may be much more quickly and easily accomplished than the manipulation of the rotary switches.

From the foregoing description of the invention, it will be perceived that the present invention provides a novel and highly useful teaching device for visually portraying, in an easily understood manner, many and varied concepts of organic chemistry. The economical and simple construction of the device, coupled with its great utility, and the benefit derived from the use of the device by the students, make it highly competitive with other visual aids used in teaching organic chemistry.

It will be understood that a number of modifications and innovations in the specific details of construction and mode of operation of the device will occur to those skilled in the art and can be incorporated in the hereinbefore described structure without departure from the basic principles underlying the invention. For example, instead of using individual light bulbs for each atom or electron, a single bulb may be used conjunctively with two or more holes in the front panel of the device to illustrate two or more electrons, atoms or radicals. Insofar, therefore, as these modifications and innovations do not depart from the basic concepts on which the invention is bottomed, it is intended that such modifications and innovations shall be circumscribed by the spirit and scope of the invention except as the same may be limited by the appended claims or reasonable equivalents thereof.

We claim:
1. A device for visually portraying principles of organic chemistry comprising:
   (a) a planar surface;
   (b) illuminable members on said surface spatially arranged relative to each other to represent the molecular structure of a plurality of organic compounds; and
   (c) means for selectively illuminating said illuminable members to portray individual organic compounds.

2. The device claimed in claim 1 wherein said illuminable members are arranged to show carbon to carbon bond angles, substituted and unsubstituted hydrocarbon compounds, and covalent and coordinate bonds in organic compounds.

3. The device claimed in claim 1 wherein said illuminable members are arranged to facilitate visual portrayal of hydrocarbon chain growth and extension.

4. The device claimed in claim 1 wherein said selective illuminating means includes switch means for sequentially illuminating illuminable members representing organic compounds of related structure, and wherein said illuminable members are arranged to position said sequentially illuminated illuminable members in juxtaposition to each other whereby the carbon atoms and electrons of said related structure compounds may be easily visualized and the structural relationships of such compounds more quickly and easily understood by an observer.

5. The device claimed in claim 1 wherein said illuminable members differ in size and color to facilitate the portrayal of electrons, carbon atoms, hydrogen atoms, oxygen atoms, nitrogen atoms and halogen atoms.

6. The device claimed in claim 1 wherein said illuminable members are grouped to permit the relationship between members of a homologous series of organic compounds to be represented.

7. The device claimed in claim 1 wherein said illuminable members each comprise an electrically energized light source and a translucent member shielding said light source from direct observation whereby glare and diffusion of light from said light sources are reduced and each individual light source is easily distinguished when a plurality of said light sources are energized.

8. A device as claimed in claim 1 wherein said illuminable members comprise:
 (a) a first set of 14 identical lights arranged with one of said lights at the corners of three contiguous, identically shaped, imaginary hexagons;
 (b) second sets of 10 lights each circumferentially arranged around each light of said first set, each of the lights in said second set being smaller in size than the lights in said first set; and
 (c) third sets of lights each including at least three lights intermediate in size between the size of the lights in said first and second sets with the lights in each of said third sets being positioned on the opposite side of each set of said second lights from the associated light of said first set.

9. A device as claimed in claim 1 wherein said planar surface comprises the front panel of a hollow parallelopiped-shaped structure having generally rectangular front, back, top, bottom and end panels.

10. A device as claimed in claim 1 wherein said means for selectively illuminating said illuminable members comprises:
 (a) source of electromotive force;
 (b) electrical circuitry connecting said source to said illuminable members; and
 (c) switch means in said circuitry for selectively opening and closing the electrical circuitry to selectively illuminate said illuminable members.

11. A device as claimed in claim 10 wherein said switch means includes a plurality of first groups of electrical switches, each of said first group of switches being connected to a group of said illuminable members, the illumination of which will visually portray at least one organic molecular species; and means for simultaneously opening and closing the switches in each of said first groups.

12. A device as claimed in claim 11 and further characterized to include a plurality of second groups of electrical switches connected in series between the switches of said first groups of switches and said illuminable members, with each of said second group of switches being connected to those of said illuminable members which are illuminated to represent a structurally related group of organic compounds, and each of said second group of switches further being connected to each of those first groups of switches which are connected through them to illuminable members, which when illuminated, will portray each organic compound in said structurally related group of compounds.

13. A device as claimed in claim 11 wherein said means for simultaneously opening and closing the switches in each of said first groups comprises a plurality of manually operable members positioned on a control panel.

14. A device as claimed in claim 11 wherein said means for simultaneously opening and closing the switches in each of said first groups comprises a card reader switching device having brush means including a plurality of electrical conductors resiliently bearing against an electrically conductive plate, and having means for guiding a perforated card between said brush means and said electrically conductive plate whereby certain preselected ones of said electrical conductors extend through the perforations in said card into contact with said electrically conductive plate.

15. A device for teaching certain principles of organic chemistry comprising:
 (a) a hollow right parallelopiped;
 (b) a plurality of illuminable indicia on one of the surfaces of largest area of said right parallelopiped, said illuminable indicia being spatially arranged relative to each other to represent the molecular structure of a plurality of organic compounds; and
 (c) means for selectively illuminating said illuminable indicia to sequentially portray individual organic compounds within a related series of organic compounds.

16. A device as claimed in claim 15 wherein said illuminable indicia comprise an individual light source for each atom in each of said compounds, and an individual light source for each electron in the bonds between said atoms.

References Cited

UNITED STATES PATENTS

| | | | |
|---|---|---|---|
| 2,085,881 | 7/1937 | Van Doren | 35—18 |
| 2,085,920 | 7/1937 | McCoy | 35—54 |
| 2,159,925 | 5/1939 | Wood | 35—54 |
| 2,688,741 | 9/1954 | Saltarelli | 340—225 |
| 3,156,985 | 11/1964 | Bliss et al. | 35—18 |

FOREIGN PATENTS 30,279  7/1964  Germany.

EUGENE R. CAPOZIO, *Primary Examiner.*

H. S. SKOGQUIST, *Assistant Examiner.*